(12) United States Patent
Grabowski et al.

(10) Patent No.: US 6,213,513 B1
(45) Date of Patent: Apr. 10, 2001

(54) BUCKLE PRETENSIONER

(75) Inventors: Richard M. Grabowski, Davisburg; Mark Richard Keyser, Lake Orion, both of MI (US)

(73) Assignee: Takata Seat Belts Inc., Auburn Hills, MI (US)

(*) Notice: Subject to any disclaimer, the term of this patent is extended or adjusted under 35 U.S.C. 154(b) by 0 days.

(21) Appl. No.: 09/565,884

(22) Filed: May 5, 2000

Related U.S. Application Data

(63) Continuation of application No. PCT/US98/24515, filed on Nov. 16, 1998, which is a continuation-in-part of application No. 08/970,849, filed on Nov. 14, 1997, now Pat. No. 5,944,350.

(51) Int. Cl.[7] .................................................. B60R 22/36
(52) U.S. Cl. ............................................................ 280/806
(58) Field of Search .............................................. 280/806

(56) References Cited

U.S. PATENT DOCUMENTS 5,364,129 * 11/1994 Collins et al. ........................ 280/806
5,588,677 * 12/1996 Kopetzky et al. .................... 280/806

FOREIGN PATENT DOCUMENTS 42 30 663 * 3/1994 (DE) .
0 557 073 * 6/1993 (EP) .

* cited by examiner

*Primary Examiner*—Kenneth R. Rice
(74) *Attorney, Agent, or Firm*—Fitch, Even, Tabin & Flannery

(57) ABSTRACT

A safety belt tensioner is provided for pulling a buckle part to tighten a safety belt system about an occupant. The tensioner includes a flexible member or cable having a first loop connected to the buckle part which pulls the buckle part when it is shortened, as by actuation of a power operated device such as a piston-cylinder device. To shorten the piston stroke while achieving the necessary displacement of the buckle part, the flexible member is provided with a second loop connected to the piston about a turning member thereof with one end of an anchored half of the second loop secured to a stationary part of the pretensioner, and the other loop half extending from the cylinder and connected to the portion of the flexible cable member for the buckle part. This provides about a 1:1 ratio between the length of piston travel and downward travel of the buckle part to minimize the piston travel to allow the length of the cylinder to be shorter for providing a more compact pretensioner. In a preferred form, the piston has a rotatable bearing member about which the second loop extends which reduces friction on the cable when the piston is fired.

18 Claims, 6 Drawing Sheets

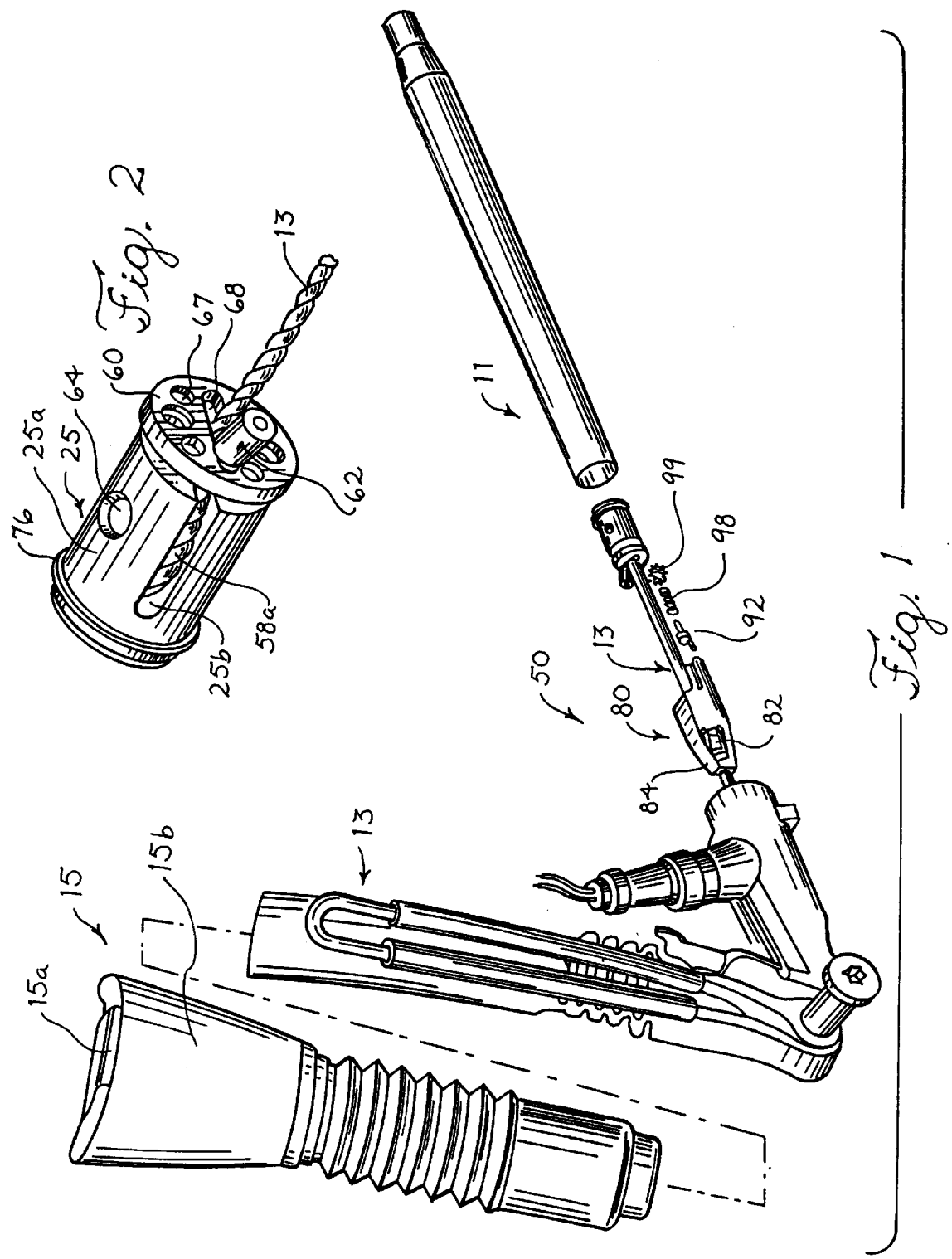

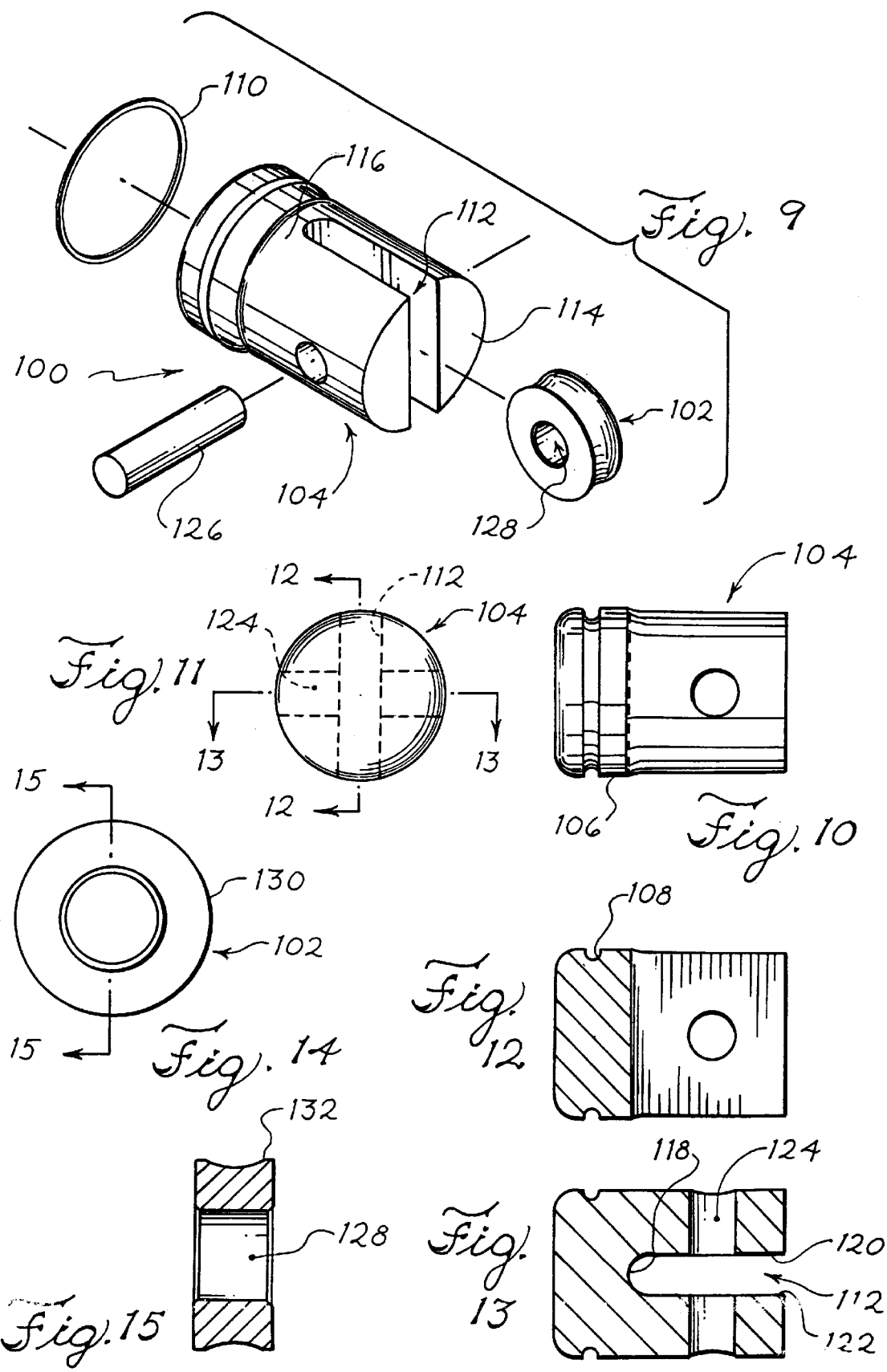

BUCKLE PRETENSIONER

This is a continuation, of prior application No. PCT/US98/24515, filed Nov. 16, 1998, which designated the United States of America which is in turn a Continuation-in-part of prior U.S. application Ser. No. 08/970,849, filed Nov. 14, 1997 now 5,944,350 which is hereby incorporated herein by reference in its entirety.

FIELD OF THE INVENTION

This invention relates to a pretensioner for safety belt systems securable to a vehicle chassis and more particularly to a pretensioner having a power-operated device for drawing a flexible member to remove slack from the seat belt system.

BACKGROUND OF THE INVENTION

A pretensioner for a seat belt system is disclosed in U.S. Pat. No. 5,588,677, which is assigned to the assignee of this invention, and in this pretensioner a buckle part of a three point seat belt system is connected to a flexible draw element in the form of an elongated wire cable. The wire cable has a loop portion looped about a roller secured to the buckle part. One end of the loop portion is secured and the other portion of the loop is pulled downwardly by a power-operated device. The preferred power-operated device has a piston which travels horizontally and pulls the attached horizontal cable portion horizontally which in turn pulls down the other portion of the loop and the attached buckle part. The loop splits the force being applied to the buckle in half, e.g., about 2,600 lbs. on each half of the loop but the loop requires twice the travel distances for the cable for each increment of downward buckle travel.

Typically, the power-operated device is a pyrotechnic gas generator that drives a piston to travel the distance necessary to remove the slack from the seat belt system. Such cylinders are usually located on or about the seat. In some instances, there is a lack of sufficient space for such a long cylinder, and there is a desire to provide a more compact pretensioner of this kind.

When the piston has traveled the full extent of the cylinder and has taken out the slack, the pretensioner will have pulled the person down into the seat, and thereafter the person and attached seat belt system begin to rebound upwardly. To prevent the passenger from rebounding and returning slack into seat belt system, a one-way locking mechanism becomes effective to resist the rebound travel of the cable. Such an automatic locking of the return travel of the wire cable is disclosed in German published application DE 42 30 663 published Mar. 17, 1994.

The pulling force of the pretensioner on the buckle part is quite large, and where the buckle part is a buckle having a locking mechanism operated by a push button, it is preferred to have a latch or blocking member that is shifted to a blocking position to prevent the push button from traveling to release the latch plate. European published patent application 0 557 073, published Jun. 29, 1993, discloses a pivotally mounted blocking member that is biased by a spring to a normal, non-blocking position and that is pivoted against the spring bias by the gas generator to a blocking position. In the blocking position, the blocking member engages and blocks travel of the push button member in the release direction. Thus, the gas generator causes a blocking of the buckle release at the time that the pretensioner is removing slack from the seat belt system.

When the acceleration sensor activates the pretensioner, it activates both the driver's pretensioner as well as the passenger's pretensioner. If the driver or the passenger is not wearing the seat belt system at the time of actuation of the pretensioner, the buckle travels downwardly very rapidly and hits its buckle housing so hard against the pretensioner housing that the buckle housing can crack or break. In order to avoid a liability claim, where a person not wearing the seat belt system alleges to have been wearing it and alleges that the seat belt buckle failed as evidenced by the broken buckle housing, it would be desirable to provide an energy absorption device or member to absorb energy and dampen the buckle impact such that the buckle housing doesn't break. Thus, a potential liability claim could be avoided.

SUMMARY OF THE INVENTION

In accordance with the present invention, a shortened piston stroke is used and achieves the necessary displacement of a buckle portion and an attached seat belt to remove slack from the seat belt system. This is accomplished by forming a loop of cable inside of the cylinder with the loop being connected to the piston. Preferably, the cable loop about the buckle and the cable about the piston are equal so that they have about a 1:1 ratio. Thus, for each unit of travel of the piston, there is an accompanying unit of travel of the buckle part. Herein, the cable is looped about a turning member within the piston with one end of an anchored half of the cable loop secured to a stationary part of the pretensioner; and the other extendible half of the loop extending from the cylinder connected to the cable portion for the buckle part.

Preferably, an energy absorber is provided with the pretensioner. The energy absorber is impacted by the buckle as it is accelerated by the power-operated device; and the energy absorber limits damage to the buckle part as it is pulled toward the pretensioner. The preferred energy absorber is in the form of inexpensive, plastic tubes located about the wire cable loop portions connected to the seat belt buckle. The buckle part deforms and deflects the tubes, thereby dissipating energy.

BRIEF DESCRIPTION OF THE DRAWINGS

The invention will now be described in the following by way of example and with reference to the drawings wherein:

FIG. 1 is an exploded view of a pretensioner embodying the preferred embodiment of the invention;

FIG. 2 is an enlarged view of a piston and stationary plate with the cable looped about a pin in the piston;

FIG. 9 is an exploded perspective view of the pulley member and piston;

FIG. 10 is a side elevational view of the piston of FIG. 9;

FIG. 11 is an end elevational view of the piston of FIG. 9;

FIG. 12 is a cross-sectional view taken along line 12—12 of FIG. 11;

FIG. 13 is a cross-sectional view taken along line 13—13 of FIG. 11;

FIG. 14 is an elevational view of the pulley member of FIG. 9; and

FIG. 15 is a cross-sectional view taken along line 15—15 of FIG. 14.

DETAILED DESCRIPTION OF THE PREFERRED EMBODIMENTS

Figure 3:
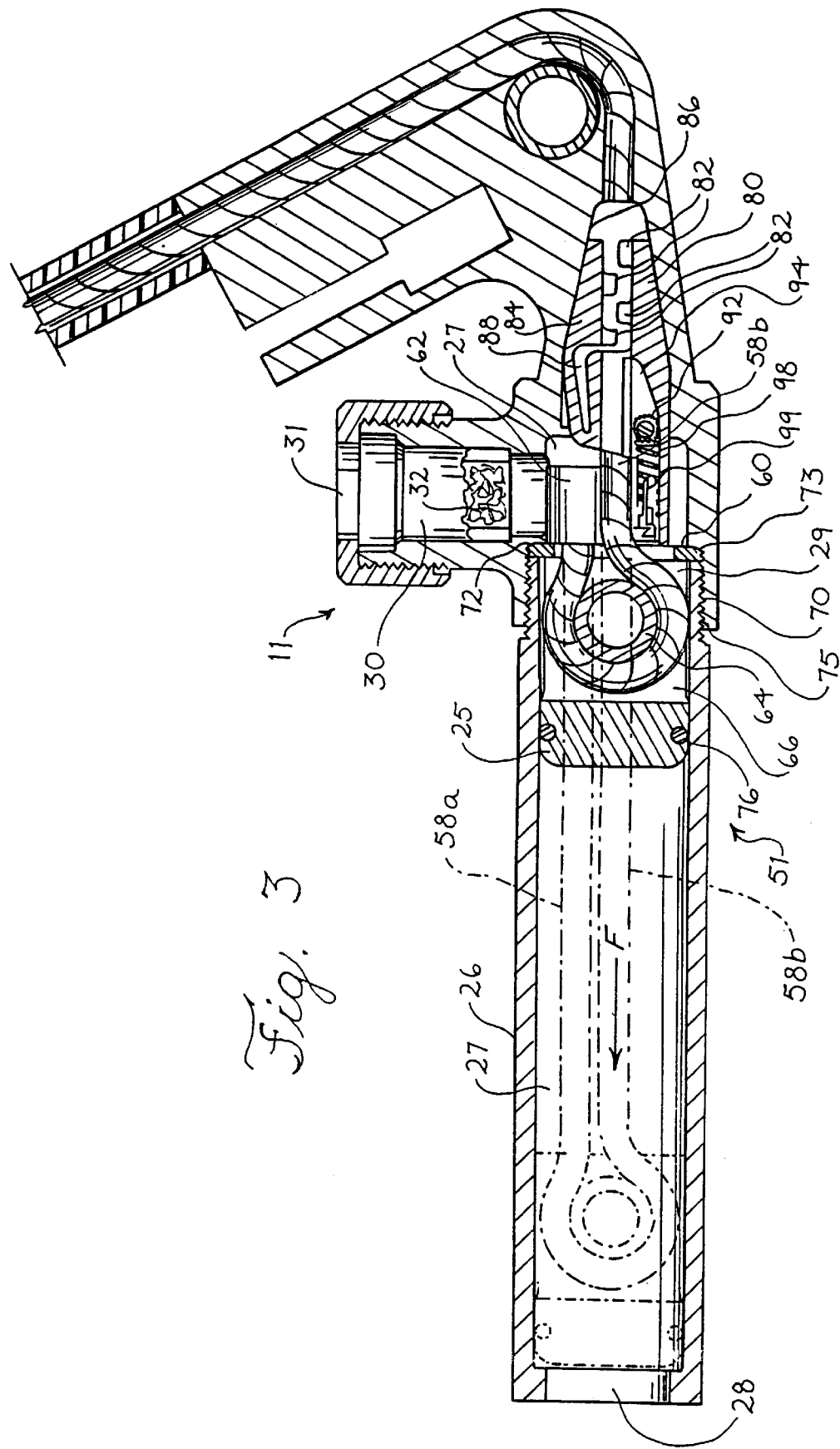
FIG. 3 is an enlarged cross-section of the pretensioner of FIG. 1.
Figure 7:
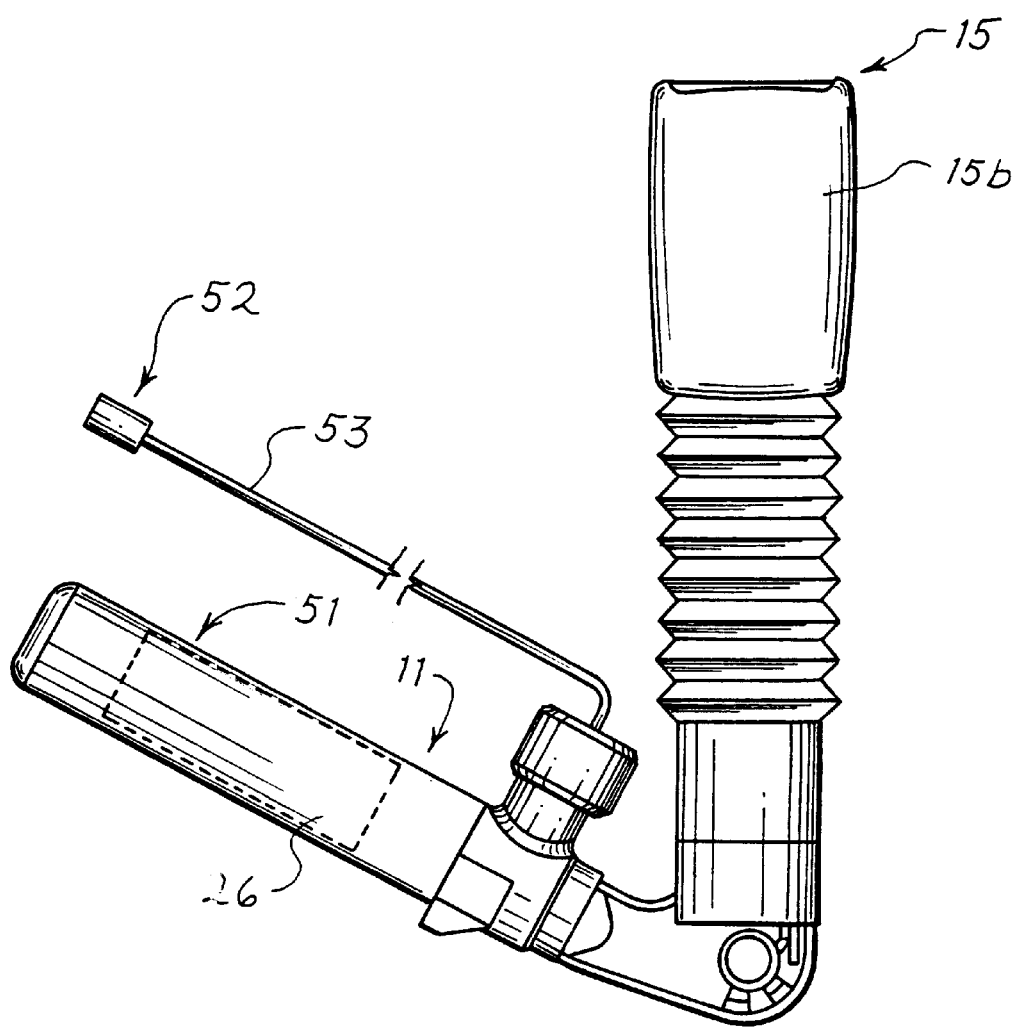
FIG. 7 is a side elevational view of the pretensioner of FIG. 6.
Figure 8:
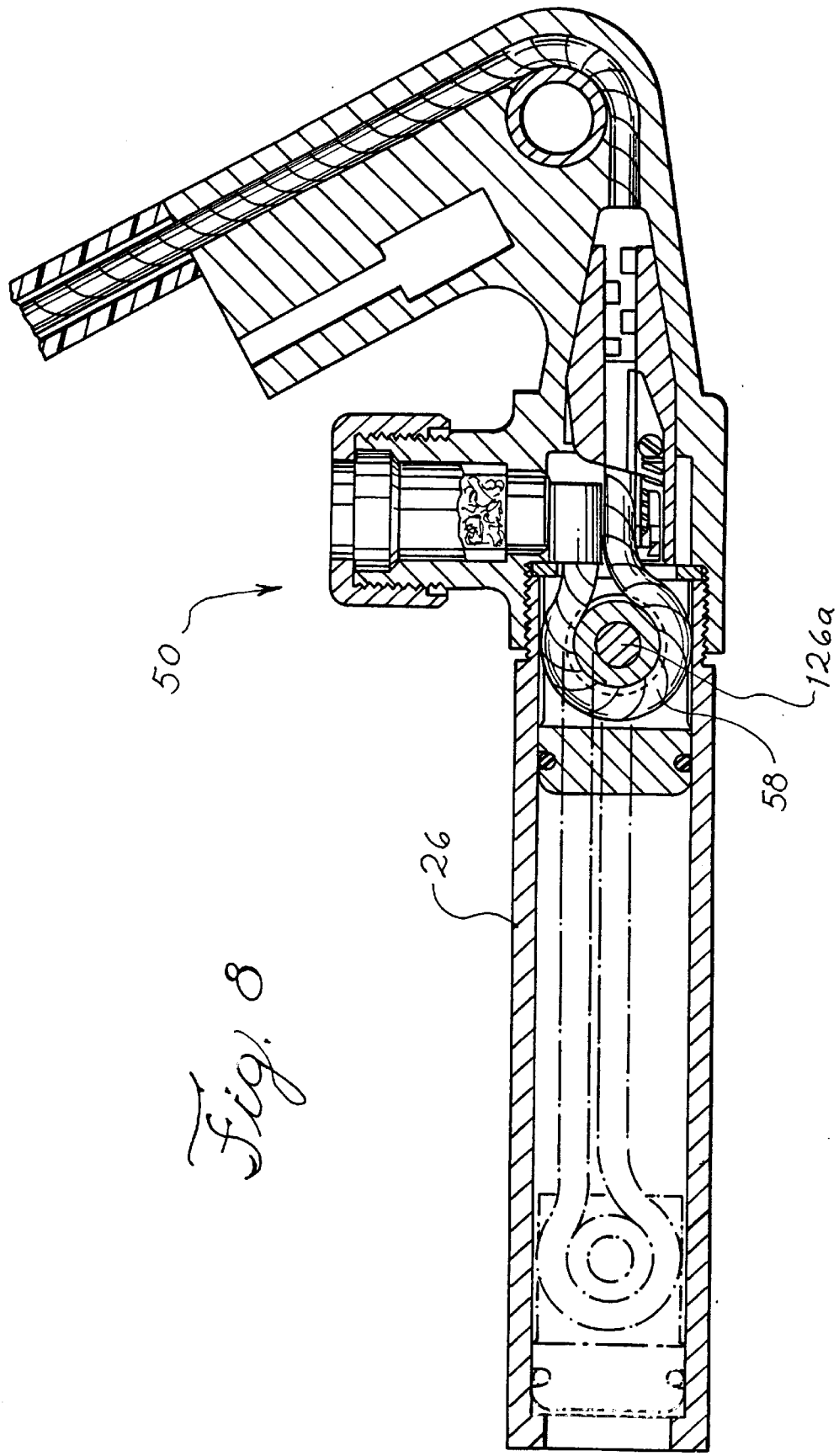
FIG. 8 is a cross-sectional view similar to FIG. 3 showing the looping of the cable about a pulley member rotatively mounted to the piston.

As shown in the drawings for purposes of illustration, the invention is embodied in a pretensioner 50 having a flexible member such as a wire cable 13 connected to a buckle part which could be either a latch plate (not shown) or the illustrated buckle 15 having a push button 15a and a housing 15b. The wire cable 13 is connected to a power-operated device 11 which is connected to and operable by an acceleration sensor 52 (FIG. 7). The power-operated device may take various forms and be operable by springs, compressed gas or the illustrated and preferred power-operated device is pyrotechnically operated and comprises a piston and cylinder unit 51 by electrical signals over electrical leads or wires 53 from the acceleration sensor 52. The illustrated power-operated device 11 comprises a piston 25 slidable in a cylinder 26 (FIG. 3). The rear cylinder space 27 of the piston and cylinder unit 51 at the end remote from the piston 25 has an opening 28 leading to the atmosphere while the cylinder space 29 located in front of the piston 25 is connected to a pyrotechnical pressure generating device 30 which can be connected by the wires 53 to the illustrated acceleration sensor 52. In the event of an accident, the sensor 52 causes a triggering of the charge 32 located in the pyrotechnical pressure generating device 30 and a high pressure gas abruptly builds up in the cylinder space 29 which displaces the piston 25 rearwardly in the direction of the arrow F (FIG. 3).

The wire cable 13 is fixedly connected to the center of a piston 25 and passes through a sealed bore at the front end of the cylinder 26 and is then guided through a straight channel 34. In the region of the straight channel a pull-back blocking device 35 is arranged around the wire cable 13.

Figure 4:
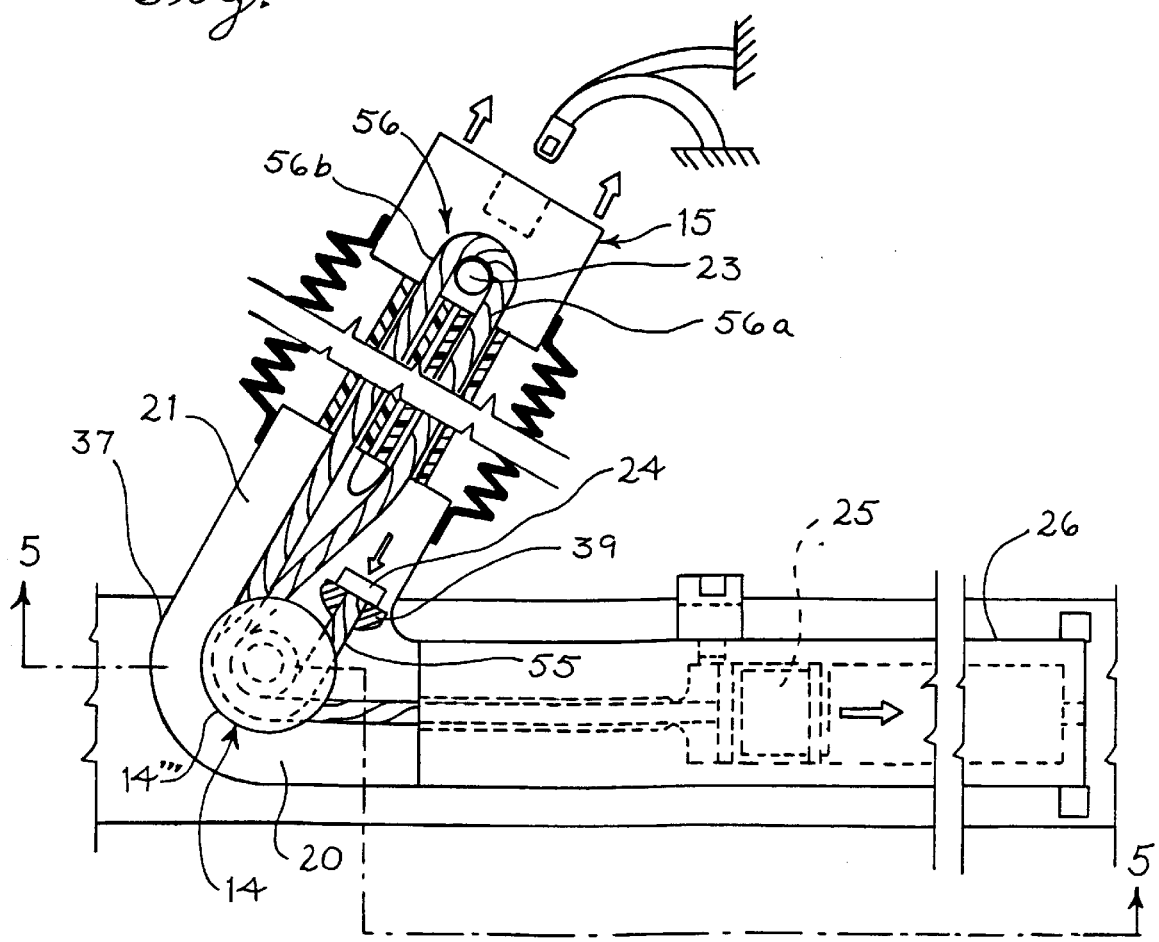
FIG. 4 is a schematic partly sectioned side view of a belt tensioner of the invention which is mounted on a vehicle chassis.
Figure 5:
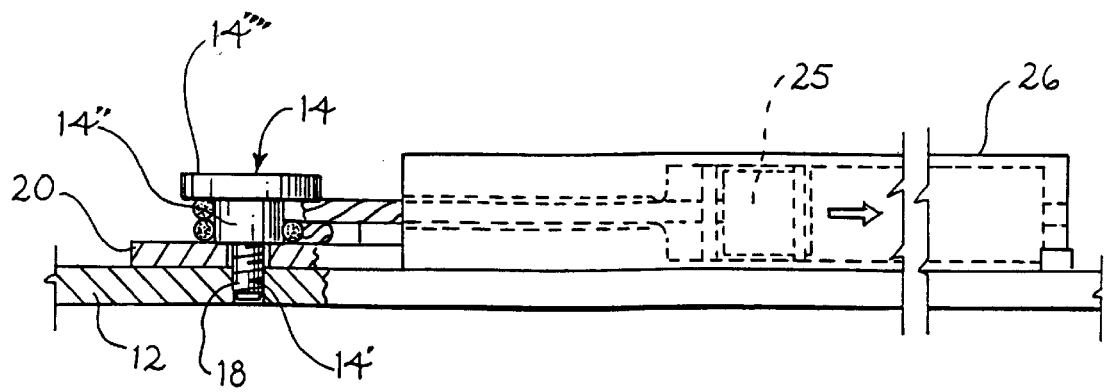
FIG. 5 is a schematic sectional view on the line 5—5 in FIG. 5.
Figure 6:
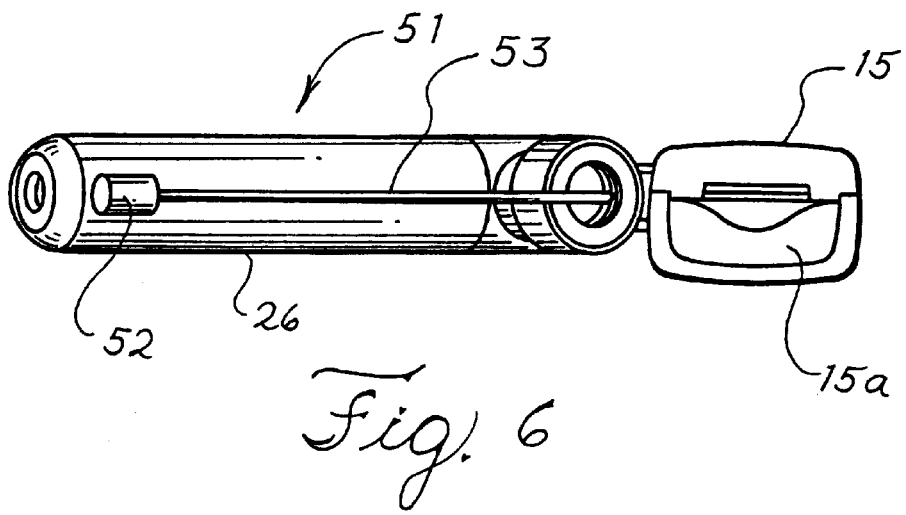
FIG. 6 is a plan view of the pretensioner of FIG. 7.

Referring now to the other end of the cable 13 and to FIG. 4, the wire cable 13 has a first end 55 secured by a fastening head or ferrule 24 (FIG. 4) to an abutment collar 39 on the pretensioner housing. The cable extends form this fixed first end 55 about a turning or deflection member 14 upwardly to an about a deflection roller 23 fixed to the buckle 15. The cable is looped about the deflection roller 23 to form a first buckle loop 56 having loop portions 56a and 56b, which are looped about the buckle part. The loop portion 56b extends down to the deflection roller 14. This buckle loop 56 is shortened when the piston 25 pulls the attached cable and travels to the right, as seen in FIGS. 4 and 5, with the loop portion 13b traveling down and the loop portion 13a also being shortened as the deflection roller 23 travels downwardly. Thus, it will be seen that it takes a relatively long cylinder to obtain the desired downward travel distance to remove the slack in the system disclosed in U.S. Pat. No. 5,588,677.

In accordance with the present invention, the length of the piston travel and of the cylinder 26 may be reduced very substantially, e.g., to provide about a 1:1 ratio between the length of piston travel and downward travel distance of the buckle 15. This is achieved by forming a second or piston loop 58 in the cable 13 and having the power-operated device elongate the piston loop 58 as it shortens the buckle loop 56. In the illustrated embodiment of the invention, the piston loop is formed with an anchored leg or loop portion 58a and an extendible leg or loop portion 58b (FIG. 3). Herein, the anchored loop portion 58a is anchored to a perforated member 60 by an enlarged fastening head or ferrule 62.

The piston loop 58 is preferably formed about a turning member, such as a cylindrical pin 64, which is mounted in a hollow chamber or portion 66 in the piston 25. As the piston travels to left in FIG. 3, it draws the cable 13 further into the cylinder with the cable entering and lengthening the legs 58a and 58b; and these legs keep extending in length as the piston travels in the cylinder. When the piston has traveled the full length of the cylinder's bore, the pin will have greatly elongate the piston loop 58 while pulling down and shortening the buckle loop 56 in about a 1:1 ratio.

Referring now to FIGS. 2 and 3, the piston 25 has a head portion with an O-ring seal 76 which seals with the interior bore wall of the cylinder to prevent the gas from flowing about and past the piston head portion.

The stationary perforated member 60 has several perforations 67 to allow the expanding gas to flow into the hollow interior chamber 66 of the piston. The ferrule 62 abuts the plate at an elongate slot 68 through which the cable end extends. The perforated plate 60 is a disc of metal having a peripheral edge to seat against an annular shoulder 73 at the end of a threaded bore 70 in the pretensioner housing. A thread 75 on the end of the cylinder is threaded into the threaded bore, and an end wall 72 abuts stationary disc 60 to fix it in place.

Also, within the pretensioner housing is the one-way locking device that prevents the tension on the cable 13 being exerted during rebound of the occupant from pulling the piston 25 back and allowing slack to return with elongation of the buckle loop 56. As disclosed in the German published application DE 42 30 663, published Mar. 17, 1994, a cable gripper 80 has a slotted portion with interleaved lugs 82 and a conically-shaped forward end 84 that can be cammed downwardly by a sloped conical wall 86 of the housing chamber. The space 88 can be collapsed in the upper portion of the forward end 84 as the cable gripper is being cammed to more tightly grip the cable 13 passing through the cable gripper. The cable slides freely through the cable gripper when the piston is being driven by expanding gas. However, during rebound of the occupant and a pulling of the cable 13 in the opposite direction, a knurled rotatable pin 92 will be rolled by cable up a ramp 94 in the cable gripper and wedged between the cable and ramp. When the pin 92 is wedged, the cable tension and rebound travel of the cable 13 will act through the wedged pin and ramp 94 to pull the cable gripper deeper into the socket where the inclined wall 86 causes the interleaved portion to be wedged down to grip tightly the cable 13, thereby stopping further travel of the cable gripper and the cable 13 in the rebound direction. The knurled pin 92 is biased by a spring 98 to engage the cable. When the piston is traveling by the expanding gas, the knurled pin is shifted by the cable to further compress the spring 98 and to move the knurled pin away from the inclined ramp 94. On the other hand, the cable, when traveling in the rebound direction, is assisted by the spring 98 to travel up the ramp 94 to wedge between the cable and the ramp 94. A small spring retainer 99 retains the spring 98 in the proper position.

Referring in greater detail to the cable travel, it travels about the deflection member 14, which has a deflection section 14" of larger diameter and at the top a head guide section 14'''' having an even larger diameter.

A plate-like projection 20 extends from the front end of the drive device 11 in unitary manner up to and beyond the deflection member 14. It is rounded off at the top at 37 and undergoes a transition there into an angled portion 21 which points obliquely upwardly and which can likewise be of plate-like design.

As can be seen in particular from FIG. 5, the projection 20 that a throughbore 19 of somewhat larger diameter in the region of a threaded bore 18 provided in the vehicle chassis 12 and a threaded bolt section 14' of the deflection member 14 is screwed into the threaded bore 18 through the bore 19. In doing so the horizontal ring step 14'''' located between the bolt portion 14' and the deflection portion 14" contacts the surface of the projection 20 around the throughbore 19 and thus presses the projection 20 against the vehicle chassis 12 so that the projection 20 including the drive device 11 and the angled portion 21 which are formed in one piece with it are securely fastened to the vehicle chassis 12. In place of the bolt section 14– a downwardly open sleeve section provided with an internal thread could also be provided which is screwed onto a threaded bolt which is secured to the chassis 12; for example, by welding, whereby the projection 20 can likewise be pressed against the chassis 12.

Referencing FIGS. 8–15, an alternative piston assembly 100 will next be described. As the construction of cylinder 26 and the remainder of the pretensioner 50 remains substantially the same as that previously-described, it will not be discussed to any great detail further herein. As discussed with respect to piston 25 in FIGS. 2–5, the cable piston loop 58 wraps about a pin 64 transversely mounted in the piston chamber 66 for pulling of the cable 13 when the pretensioner fires and the piston 25 is driven for sliding in the cylinder 26. Because pretensioner firing exerts such heavy loading and forces on the piston, substantial frictional rubbing and wear occurs at the interface between the cable 13 and pin 64 which is fixed to the piston 25 as the piston is driven and the cable 13 travels therearound.

Accordingly, the alternative piston assembly 100 incorporates a rotatable bearing in the form of pulley member 102 about which the cable loop 58 is wrapped. Thus, as the piston 104 is propelled in the cylinder 26, the cable 13 will be pulled by the pulley member 102 which will rotate as the cable 13 travels around the pulley member 102 with the cable portions 58a and 58b lengthening. The rotation of the pulley member 102 lowers the friction generated on the cable 13, and in particular between the cable 13 and the member 102 over that created with a fixed pin 64 when the piston is driven. The lowered friction in turn reduces the abrasion and wear on the cable 13 lessening the chance of its premature failure.

Turning to FIGS. 9–15 for a more detailed description of the alternative piston assembly 100, the piston 104 has a solid head end 106 provided with an annular groove 108 for receipt of a seal in the form of a resilient O-ring seal member 110 therein which slides along the inside of cylinder wall 26. The seal 110 keeps the expanding gas from passing past the piston head 106 when the pretensioner is fired.

At its opposite end, the piston 104 has an elongate slot 112 that opens to end face 114 of the piston 104 and extends diametrically thereacross opening along annular surface 116 of the piston 104. The slot 112 as shown extends past the midpoint along the length of the piston 104 and ends at curved wall portion 118 with the slot 112 bounded on either side by parallel side wall portions 120 and 122.

The side walls 120 and 122 are spaced so as to accept the pulley member 102 therebetween with slight clearance on either side of the pulley member 102 to allow for its rotation in the slot 112 when the pretensioner is fired. The piston also includes a transverse bore 124 that opens to surface 116 at points spaced approximately ninety degrees from where the slot 112 opens to the piston surface 116. The bore 124 also opens to the slot sidewalls 120 and 122 in the piston slot 112 such that pin 126 tightly received in the bore 124 has a central portion 126a thereof exposed in the slot 112.

The pulley member 102 has an annular shape including a central opening 128 for receipt of the pin 126 therethrough. The opening 128 is sized sufficiently large relative to the diameter of the pin 126 so that the pulley member 102 can rotate thereon. To provide for receipt of the loop 58 therearound, the exterior peripheral surface 130 of the pulley member 102 is recessed by way of a generally concave depression 132 to provide for greater surface contact with the cable 13 run therein. Finally, the diameter of the pulley member 102 is smaller than the diameter of the piston 104, and is sized so that with the cable loop 58 wrapped therearound, the cable 13 will not project beyond the surface 116 of the piston 104.

From the foregoing, it will be seen that the present invention provides an energy absorber to prevent breakage of a buckle part during a pretensioning operation. Further, the stroke of the piston and length of the cylinder may be reduced to provide a smaller and more compact pretensioner.

What is claimed is:

1. A safety belt tensioner operable by an inertia sensor to pull a buckle part through a predetermined distance to tighten a safety belt system about a vehicle occupant, said tensioner comprising:

a flexible member having a first loop connected to the buckle part to pull the buckle part to travel as the first loop is shortened;

a power-operated device operable by the inertia sensor being connected to the flexible member to pull the buckle part with operation of the power-operated device;

a second loop of the flexible member having first and second loop portions connected to the power-operated device to elongate the second loop as the first loop is being shortened.

2. A safety belt tensioner in accordance with claim 1 wherein the power-operated device comprises a cylinder, and a piston traveling in the cylinder with the second loop of the flexible member being connected to the piston.

3. A safety belt tensioner in accordance with claim 2 wherein the piston is driven by a gas; and a perforated member is provided in the cylinder to anchor one end of the second loop of the flexible member and allows gas to flow therethrough to the piston.

4. An apparatus in accordance with claim 2 wherein a turning member is provided in the piston with the first and second portions of the second loop extending to and about the turning member and back to a stationary end of the loop.

5. An apparatus in accordance with claim 4 wherein the piston has a hollow portion; and the turning member is a cylindrical pin in the hollow portion of the piston.

6. An apparatus in accordance with claim 2 wherein the first loop of the flexible member attached to the buckle part and the second loop of the flexible member is attached to the piston have about a 1:1 ratio of travel distances.

7. An apparatus in accordance with claim 1 including an energy absorber to be impacted by the buckle part during its travel by the pulling of the loop so as to avoid breaking a housing for the buckle.

8. An apparatus in accordance with claim 7 comprising a pretensioner housing; and the energy absorber is positioned between the buckle part and the pretensioner housing.

9. An apparatus in accordance with claim 8 wherein the energy absorber comprises hollow tubes about portions of the first loop to be crushed by the buckle part during the energy absorption.

10. An apparatus in accordance with claim 2 wherein the power-operated device comprises a pyrotechnic gas generator operated by the inertia sensor.

11. An apparatus in accordance with claim 10 wherein a stationary plate having perforations thereon is provided in the cylinder and gas generated by the gas generator passes through the perforations to drive the piston; and a securing device secures an end of the flexible member to the perforated plate.

12. An apparatus in accordance with claim 10 wherein the flexible member comprises a wire cable having two loop portions projecting through perforations in the perforated plate; and the securing device comprises a ferrule fixed to wire cable and having a size larger than the perforation in the plate.

13. A safety belt tensioner operable by an inertia sensor to pull a buckle part through a predetermined distance to tighten a safety belt system about a vehicle occupant, said tensioner comprising:

a flexible member connected to the buckle part to pull the buckle part to travel to tighten the safety belt system;

a power-operated device operable by the inertia sensor and being connected to the flexible member to pull the buckle part with operation of the power-operated device; and an energy absorber to be impacted by the buckle part after operation of the power-operated device to absorb energy to limit the amount of deformation of the buckle part.

14. An apparatus in accordance with claim 13 comprising a pretensioner housing; and the energy absorber is positioned between the buckle part and the pretensioner housing.

15. An apparatus in accordance with claim 13 wherein the energy absorber comprises a hollow tubular member about the flexible member to be crushed by the buckle part during the energy absorption.

16. An apparatus in accordance with claim 15 wherein the power-operated device comprises a pyrotechnic gas generator operated by the inertia sensor.

17. An apparatus in accordance with claim 2 wherein the piston includes a rotating bearing member about which the second loop extends for reducing friction on the flexible member during piston travel in the cylinder.

18. An apparatus in accordance with claim 17 wherein the piston includes a slot, and the rotating bearing member is a pulley member mounted for rotation in the piston slot.

\* \* \* \* \*